(12) United States Patent
Pavlykivskyj

(10) Patent No.: US 6,870,277 B2
(45) Date of Patent: Mar. 22, 2005

(54) ENERGY SYSTEM FOR ELECTRIC VEHICLE

(76) Inventor: Mykhaijlo Pavlykivskyj, 2639 West Cortez, Chicago, IL (US) 60622

( * ) Notice: Subject to any disclaimer, the term of this patent is extended or adjusted under 35 U.S.C. 154(b) by 0 days.

(21) Appl. No.: 10/758,805

(22) Filed: Jan. 16, 2004

(65) Prior Publication Data

US 2004/0178009 A1 Sep. 16, 2004

Related U.S. Application Data

(63) Continuation-in-part of application No. 09/890,474, filed as application No. PCT/US01/03366 on Feb. 1, 2001, now abandoned.
(60) Provisional application No. 60/179,944, filed on Feb. 3, 2000.

(51) Int. Cl.[7] .................................................. H02K 7/00
(52) U.S. Cl. ............................ 290/1 R; 290/1 A; 322/4
(58) Field of Search ............................... 290/1 R, 1 A, 290/3, 45; 322/4, 1

(56) References Cited

U.S. PATENT DOCUMENTS

| | | | | |
|---|---|---|---|---|
| 3,497,026 A | * | 2/1970 | Calvert | 322/4 |
| 4,218,624 A | * | 8/1980 | Schiavone | 290/45 |
| 4,309,620 A | * | 1/1982 | Bock | 290/4 R |
| 4,423,794 A | | 1/1984 | Beck | 180/165 |
| 4,454,463 A | | 6/1984 | Popescu | 322/4 |
| 4,473,753 A | | 9/1984 | Izumi et al. | 290/45 |
| 4,484,083 A | * | 11/1984 | Jefferies | 290/45 |
| 4,629,947 A | * | 12/1986 | Hammerslag et al. | 318/161 |
| 4,926,107 A | * | 5/1990 | Pinson | 322/4 |
| 5,514,923 A | | 5/1996 | Gossler et al. | 310/74 |
| 5,731,645 A | * | 3/1998 | Clifton et al. | 310/74 |
| 5,931,249 A | * | 8/1999 | Ellis et al. | 180/165 |

FOREIGN PATENT DOCUMENTS

| WO | PCT/US01/03366 | 4/2001 |
|---|---|---|
| WO | PCT/US01/03366 | 9/2001 |

* cited by examiner

*Primary Examiner*—Nicholas Ponomarenko
(74) *Attorney, Agent, or Firm*—Cook, Alex, McFarron, Manzo, Cummings & Mehler, Ltd.

(57) ABSTRACT

An energy providing system for an electric vehicle is described. The system includes a rotor mounted on a generator. A rechargeable or replaceable battery provides electric energy to a starter motor which initiates rotation of the rotor. The rotor is coupled to a generator which supplies electric energy to a motor that powers the vehicle drive train. The system is attached to the interior of the vehicle body and is maintained in a substantially horizontal position even when the vehicle travels over uneven surfaces.

7 Claims, 4 Drawing Sheets

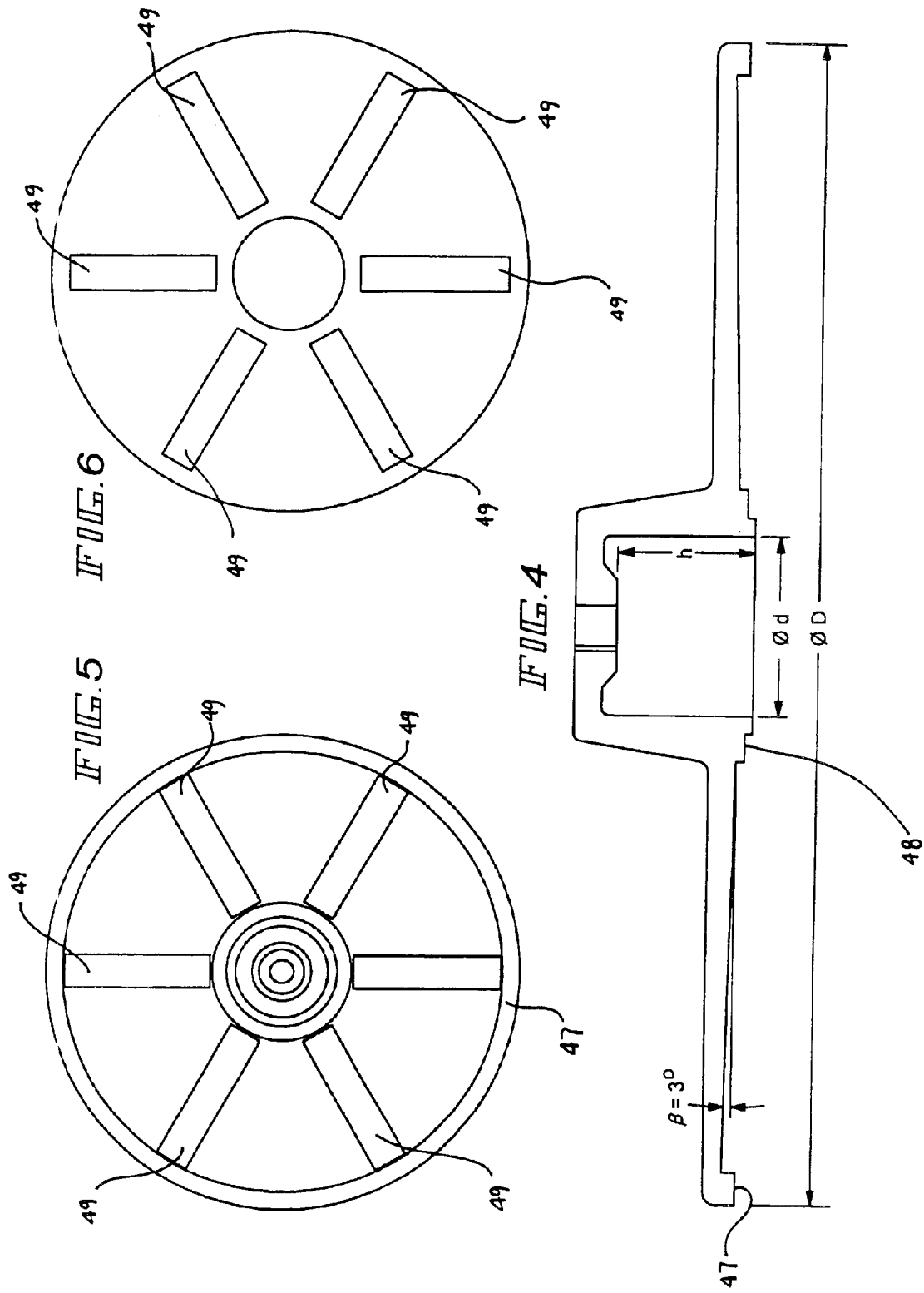

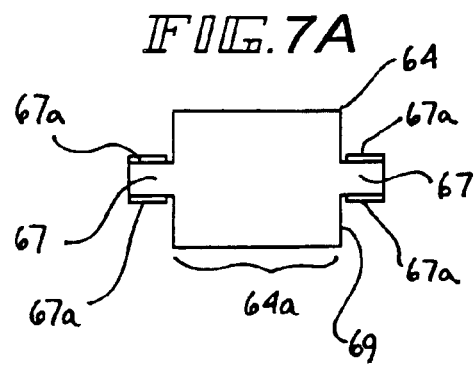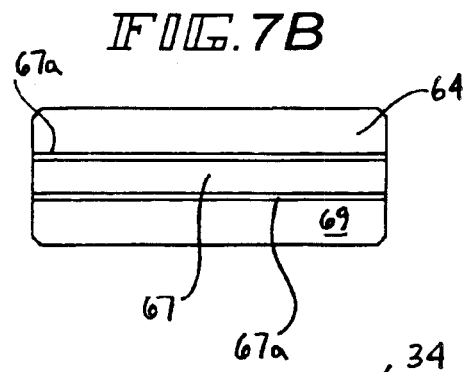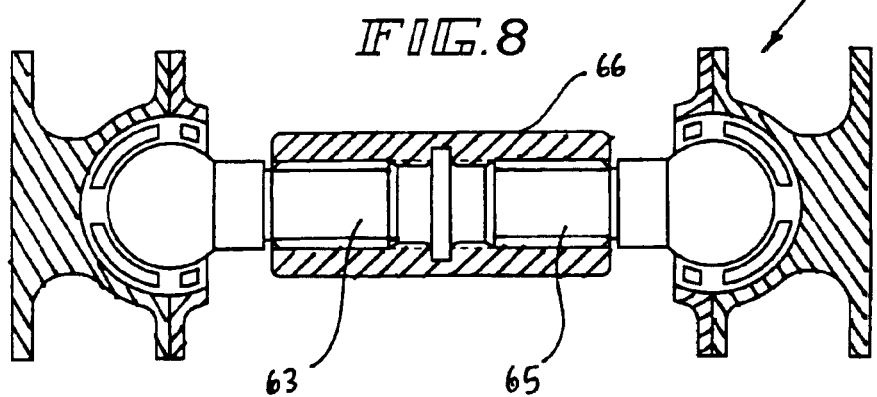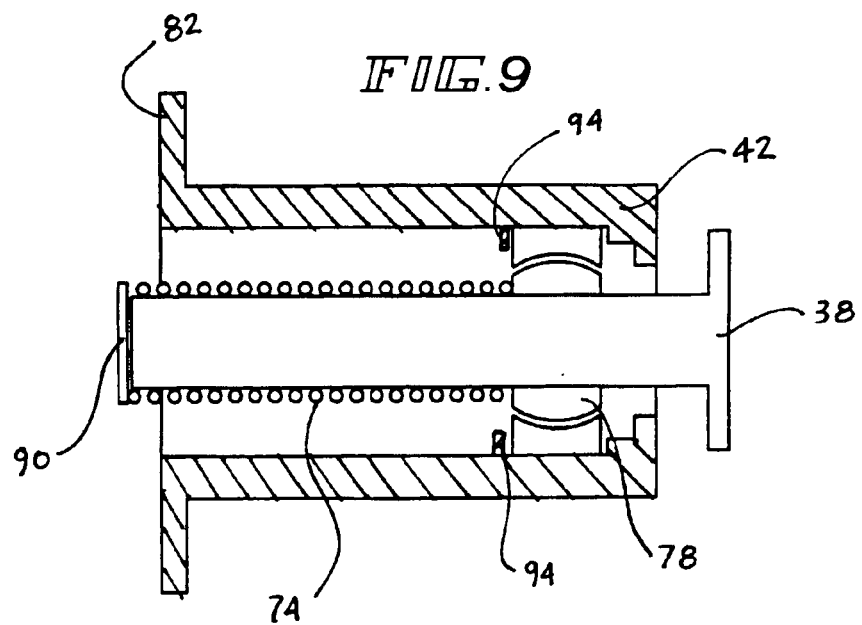

ENERGY SYSTEM FOR ELECTRIC VEHICLE

CROSS-REFERENCE TO RELATED APPLICATIONS

This application is a continuation-in-part of U.S. application Ser. No. 09/890,474, filed Aug. 1, 2001 now abandoned, which is a national stage of International Application No. PCT/US01/03366, filed Feb. 1, 2001, which claims the benefit of U.S. Provisional Patent Application Ser. No. 60/179,944, filed Feb. 3, 2000.

FIELD OF INVENTION

The present invention relates generally to electric vehicles and energy or energy systems for such vehicles. More specifically, the present invention relates to a system for providing energy to the vehicle in a way that preserves and extends the life of the battery. Finally, the present invention relates to an electric vehicle and to the placement of the energy system, such as a generator and associated components within the electric vehicle.

BACKGROUND OF THE INVENTION

Concerns about air pollution emitted by gasoline powered automobiles, the cost of fuel, and noise pollution have led to a great interest in the area of alternative means for powering vehicles such as automobiles. Of particular interest are vehicles that are powered in whole or in part by electrical energy. These vehicles are typically powered by the electrical energy provided by a battery.

One of the drawbacks of electrically powered vehicles, however, is the capacity of the batteries to adequately power the vehicles. The frequent need to recharge batteries and/or replace batteries has made the development and manufacture of electrically powered vehicles commercially non-viable.

Accordingly, it would be desirable to provide an electric vehicle that can travel relatively longer distances with less frequent replacement and/or recharging of the batteries. Moreover, it would be desirable to provide an electric vehicle wherein the life of the batteries can be preserved.

SUMMARY OF THE INVENTION

The present invention addresses all of the above-described problems with the existing electrical vehicles.

In one aspect, the present invention is directed to an energy system for an electric vehicle that includes a generator for providing electrical energy, a rotor coupled to the generator and a starter motor for initiating rotation of the rotor. The rotor is rotatably mounted on the generator.

In another aspect, the rotor includes mobile weights housed within cavities of the rotor. In another aspect of the present invention, at least the generator and rotor may be attached to the interior body of the car. The rotor and generator remain stable and in a substantially horizontal position, even when the vehicle travels over uneven surfaces.

Thus, in another aspect, the present invention is directed to an energy providing system that includes means for maintaining the rotor and generator in a substantially horizontal position. In one aspect, the means for maintaining the rotor and generator in a stable, substantially horizontal position includes a double bearing assembly attached to the interior of the vehicle body and to a framework attached to the generator.

BRIEF DESCRIPTION OF THE DRAWINGS

FIG. 4 is a cross-sectional view of the top portion of the rotor of the energy system of the present invention;

FIG. 5 is a plan view from the bottom of the top portion of the rotor of the present invention;

FIG. 6 is a plan view of the bottom portion or base plate of the rotor of the present invention.

FIG. 7A is a front view of a mobile weight used with the rotor of the present invention;

FIG. 7B is a side view of the moving weight of FIG. 7A;

FIG. 8 is a partial, cross-sectional view of the double bearing assembly of the energy system of the present invention; and FIG. 9 is a partial, cross-sectional view of the columnar member of the energy system of the present invention.

DETAILED DESCRIPTION OF THE DRAWINGS

Figure 1:
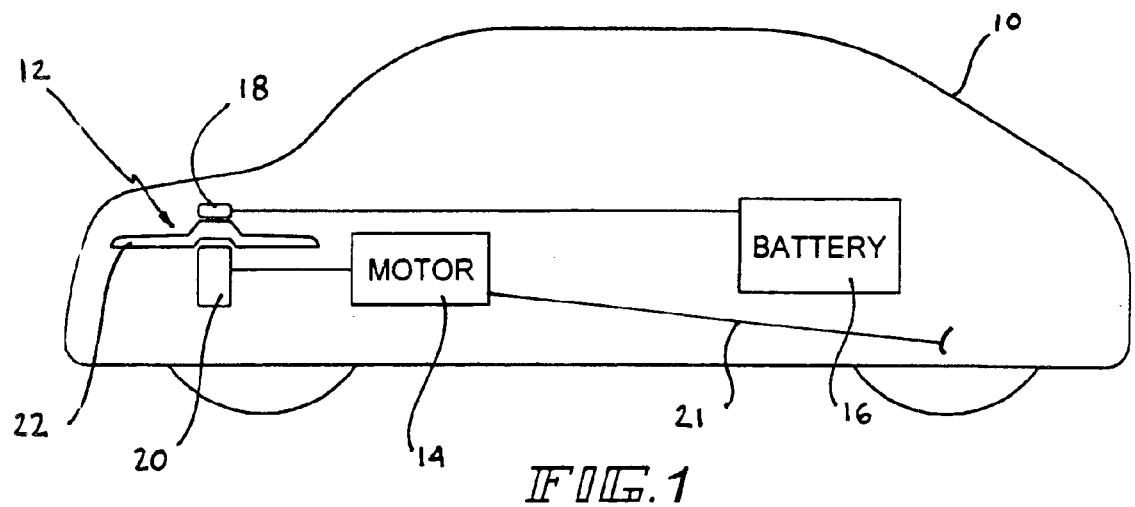
FIG. 1 is a side view of an electrical vehicle embodying an energy system of the present invention in association with other components.

Turning now to the figures, FIG. 1 shows a vehicle 10 including the energy system of the present invention. As shown in FIG. 1, vehicle 10 includes the energy system 12, preferably located in the front of the vehicle. The energy system 12 is electrically coupled to a motor 14, which powers the drive train 21 of the vehicle. Battery 16 may be located near the rear of the vehicle and provides electric energy to the starter motor 18 of the system 12.

Battery 16 provides electric energy to a starter motor 18 which is coupled to generator 20 and initiates rotation of rotor (flywheel) 22 which is coupled to the rotating shaft of generator 20. Generator 20 powers motor 14, which in turn is coupled to the drive train 21 and axles of the vehicle. During operation, the motor will eventually slow in response to the load of the vehicle, the wind resistance, and the resistance from the road, etc., and requires energy from generator 20. A tachometer or other comparable monitoring device (not shown) monitors the rotation. When the rotation or energy falls to a predetermined level, the battery 16, which is linked to starter motor 18, will be prompted to provide electric energy to starter motor 18, and repeat the above process. Although the operation of the battery 16 is not constant, the periodic operation of the battery will require recharging or replacement of battery 16. However, because battery 16 is only required to provide the initial electric energy to the starter motor, the life of the battery can be prolonged.

Figure 2:
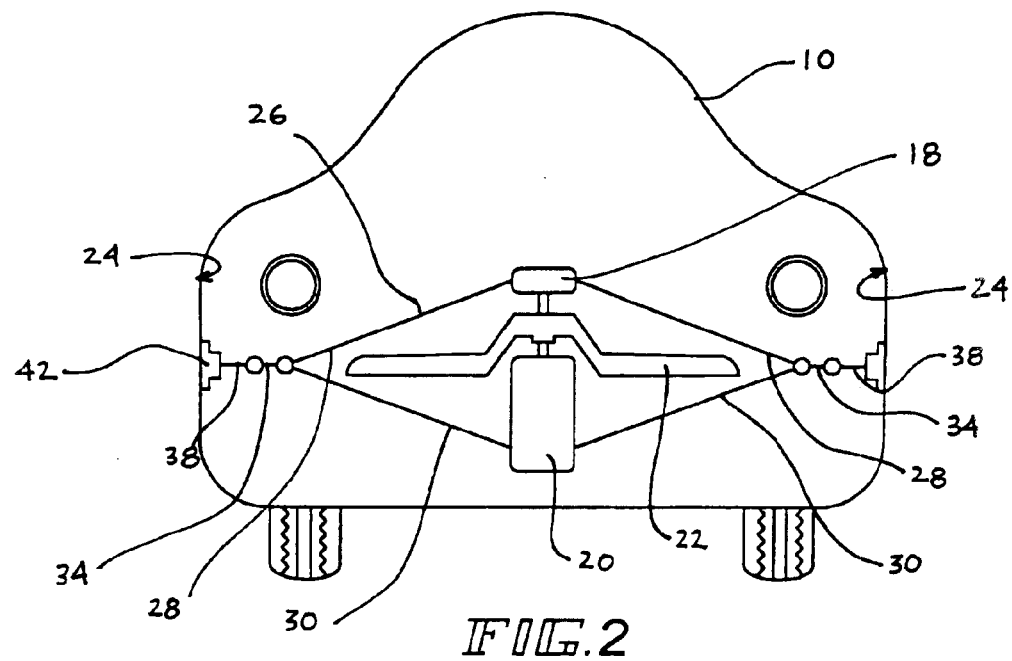
FIG. 2 is a front view of an electrical vehicle embodying the energy system of the present invention.

As shown in FIGS. 1 and 2, the energy system 12 is typically located within the body of the vehicle where, in a gasoline powered vehicle, the internal combustion engine would have been. System 12 may include, in general, a generator 20 and a rotor 22 rotatably mounted to generator 20 via wrapping flange or sleeve 19. A starter motor 18 may also be located near the rotor 22. It is preferred that starter motor 18 be placed in a horizontal position and that the entire cluster of rotor, generator, starter motor be balanced. The generator, rotor and electrical starter motor 18 are attached to the body interior 24 of the vehicle 10 by a framework 26, as shown generally in FIG. 2. The center of gravity of the cluster of the generator 20, rotor 22 and motor should be lower than the horizontal line of the arms 28 and 30 of the supporting framework. The arms 28 and 30 of the framework 26 are attached to one end of the double bearing assembly 34, shown generally in FIG. 2, and in more detail in FIG. 8. The other end of the double bearing assembly is attached to a moveable shaft 38. As described in more detail below, shaft 38 is attached to and moveable within a columnar member 42. Member 42 is, in turn, attached to the interior of vehicle body 24.

Figure 3:
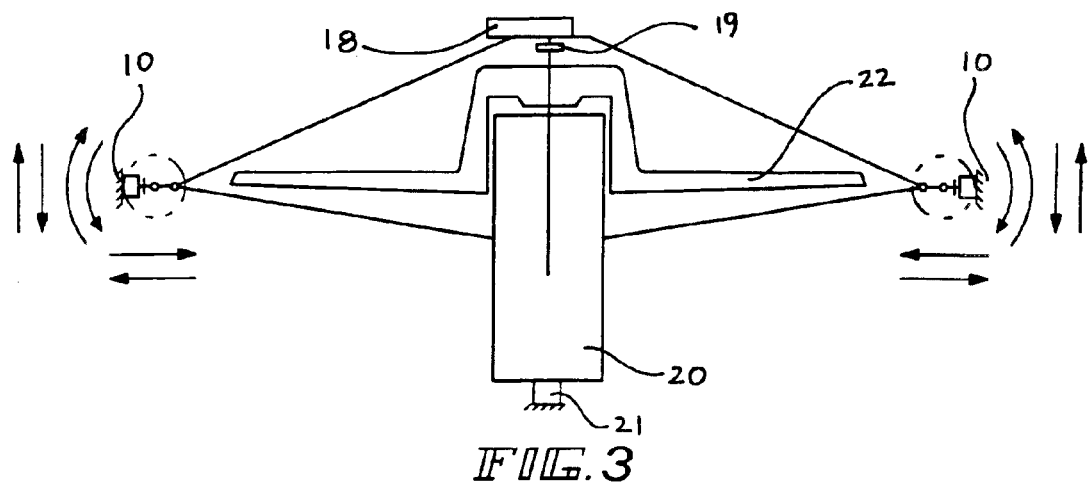
FIG. 3 is a perspective view of the energy system of the present invention.

A more detailed view of the energy system 12 of the present invention is shown in FIG. 3. As shown in FIG. 3, generator 20 may be attached by resilient mount 21 to the floor of vehicle 10. Rotor 22 is rotatably mounted on the generator 18. Rotor 22 is attached to the interior rotating portion of generator 20. Rotation or rotor 22 thereby causes rotation of the interior components (shaft) of generator 20 to produce electric energy, as will be understood by those of skill in the art.

Starter motor 18 may also be coupled to rotor 22 by wrapping flange or sleeve 19. Starter motor 18 provides the impulse energy to initiate rotation of rotor 22. The initial electric energy may be provided to starter motor 18 by battery 16, as previously described and shown in FIG. 1.

Figure 3A:
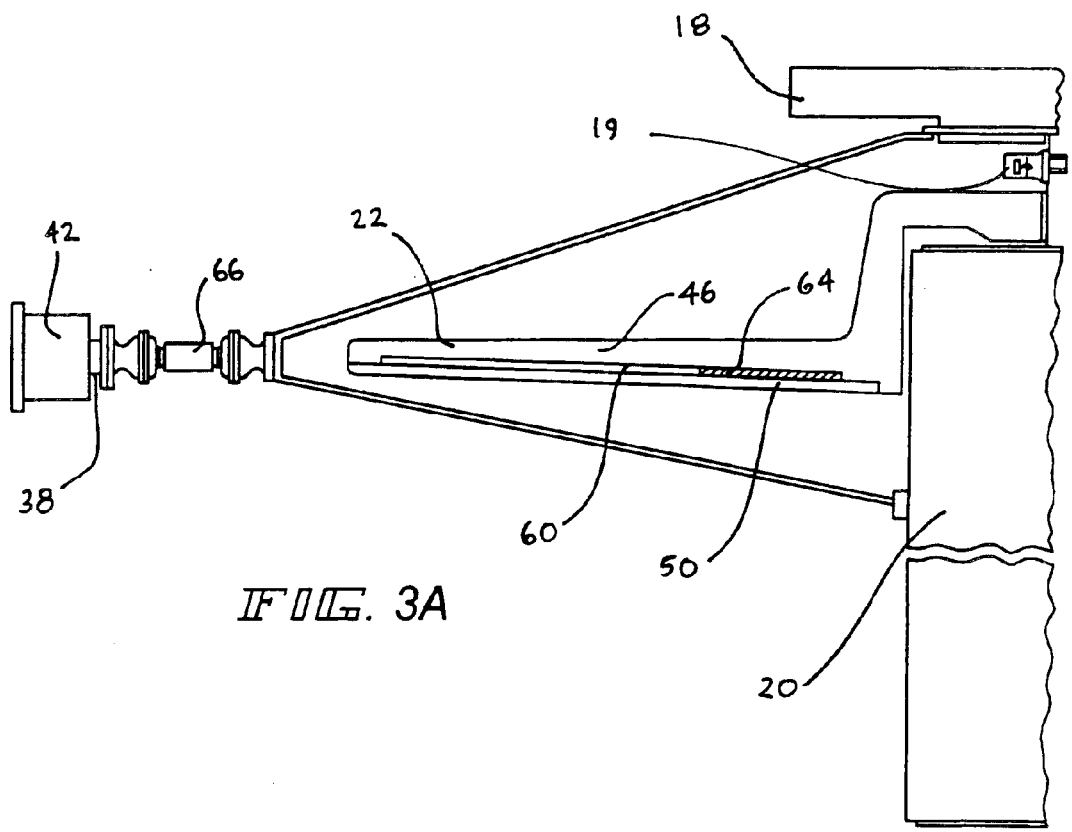
FIG. 3A is a partial, enlarged view of the energy system of the present invention.

The principal part of the rotor 22 is shown in FIGS. 3A and 4. As shown in FIG. 4, rotor 22 (or flywheel) includes a top portion 46 and a second bottom portion or base plate 50. The top and bottom portions 46 and 50 may be attached by any known means, such as bolts or screws. Top portion 46 of rotor 22 includes a depending lip 47, as shown in FIG. 4, and is relieved to receive bottom plate 50. Accordingly, when the two portions of rotor are brought together, the peripheral portion of base plate 50 is attached to depending lip 47 and the interior portion of the base plate is fitted into and attached to relieved portion 48 of rotor top portion 46. When brought together, the two portions provide gaps or raceways 60 to facilitate movement of mobile weights 64, as described in more detail below. It is preferred that the surfaces of the top and bottom portions that define raceways 60 have a minimal roughness and, more preferably, that they be polished.

The rotor may be made of iron, steel or any other suitable metal. The diameter "d" will depend on the diameter of the generator and the depth "h" will depend upon the length of the generator. Preferably, depth "h" is approximately □ of the length of the generator. The diameter "D" may be any size, but will depend, in part, on the size of the vehicle.

Top portion 46 and bottom portion 50 also define slots or cavities in the rotor. As shown in FIGS. 5 and 6, cavities are radially spaced on rotor 22 (like spokes on a wheel). In the preferred embodiment, the rotor may include six (6) generally rectangular cavities 49 to receive the mobile weights. Of course, rotor 22 may have more or fewer cavities, as desired, provided that the cavities are uniformly spaced on the rotor to maintain balance. To provide for perfect leveling of the cavities, the cavities are made with the top and bottom portions of the rotor attached. It is preferred that the cavities be polished.

As shown in FIGS. 7A and 7B, mobile weights (which may be made of steel or other metal) are substantially rectangular. The width 64a of the moveable weights 64 is essentially equal to the width of the cavities 49. When the gear is at rest, the weight is at a minimum distance from the center of rotation. This will provide a minimal or small starting load for the starter motor 18. As rotor 22 begins to spin and the mobile weights move radially outwardly toward the outer periphery of the rotor, it turns the shaft of generator 20 which supplies energy to motor 14.

At the time of assembly of rotor 22, weights 64 are placed in cavities 49. In one embodiment, the weights may include slides 67 to facilitate movement of the mobile weights within the cavities. The surfaces 67a of slides 67 may, optionally, be treated or covered with plastic or other material. When the top and bottom portions of rotor 22 are brought together, slides 67 of mobile weights are located within the gap or raceway 60 formed by the portions of the rotor. In another embodiment, weights 64 may include rollers instead of slides. It is preferred that the sides 69 of the weights 64, which contact the sides of the cavities 49, be polished.

Also, as shown in FIG. 4, raceway 60 may be slightly angled. In a preferred embodiment, the difference in the raceway width at the central portion of the rotor and the more peripheral portion is on the order of approximately 3°. The slight angle facilitates return of the mobile weights to their starting positions (i.e., near the center of rotation).

The double ball bearing assembly 34 is shown in FIG. 8 in partial cross-section. The assembly includes a left portion 63, and the other has a right portion 65. The two portions of the assembly are joined by a connecting piece 66. The length of connecting piece 65 may be varied to improve the ability of the system to compensate for movement of the vehicle over uneven surfaces. This assembly also allows for easier servicing and adjustments.

One end of the double bearing assembly 34 is attached to columnar member 42, and more specifically to shaft 38 disposed within columnar member 42. Shaft 38 is fitted with spring 74 to allow for limited side-to-side movement of shaft 38 and, consequently, double bearing assembly 34. Spherical bearing 78 also allows for limited vertical (up and down) movement of shaft 38. Spherical bearings may be made of steel, plastic or any other suitable material, as will be appreciated by those of skill in the art.

The outer columnar member 42 is attached at flange 82 to the interior of vehicle body 10, as shown in FIG. 2. The combination of double bearing assembly 34 and moveable shaft 38 allows for limited up and down, side-to-side and angular movement of the assembly, as shown by the directional arrows in FIG. 3. Thus, when vehicle 10 moves over uneven or graded surfaces, this combination compensates for any changes in surface contour while maintaining the generator and rotor in a substantially horizontal position. This also maintains stability of the vehicle 10.

The shaft 9 for attachment to the vehicle body is shown in FIG. 9. As shown in FIG. 9, the shaft has the ability to move horizontally, whereby the spring recoils to its initial position. Also, shaft 38 may move in a limited vertical position, allowing the angle to change. The body of the columnar member 42 is attached to the automobile body. The nut 90 keeps the spring in place and an end ring 94 holds the bearing 78.

In a preferred embodiment, spare car batteries may be maintained in a cassette used in the free space which would have held the fuel tank, as well as part of the trunk area. The assembled cassettes may be stored therein. The cassette may be removable. Service stations will have spare cassette storage, as well as a charging station.

The present invention has been described in connection with its preferred embodiments. It will be understood that the present invention may also be embodied in other forms without departing from the spirit or characteristics of the invention. The above description is intended to be illustrative and non-restrictive, and the invention is not limited to the above-description, but is set forth in the appended claims.

What is claimed:

1. A power generating assembly in a vehicle comprising:
   a generator for generating an electrical power;
   a rotor assembly attached to said generator having a plurality of uniformly spaced cavities disposed about the center thereof and defining a plurality of raceways;
   a plurality of mobile weights within said raceways, said weights adapted for movement within said cavities; wherein
   said rotor assembly and said generator being held by a framework attached to the vehicle; wherein
   said framework has first and second double-bearing assemblies.

2. The system of claim 1 wherein said framework is attached to said vehical by a pair of columnar members, each of said colmnar members defining a central bore and movable shaft within said bore, wherein said shaft is capable of horizonal movement.

3. The system of claim 2 wherein said shaft is coupled to a spherical bearing.

4. The system of claim 2 wherein one end of said shaft is attached to one of said double-bearing assemblies.

5. The system of claim 1 wherein said mobile weight includes a pair of slides for facilitating movement of said weights within said raceway.

6. The system of claim 1 wherein said raceway is inclined between said central and peripheral regions of said rotor to facilitate movement of said mobile weights toward said central region of said rotor.

7. The system of claim 6 wherein said raceway at said radially outward peripheral end of said rotor is upwardly inclined by approximately 3° relative to said raceway the radially inward end of said rotor.

* * * * *